(12) United States Patent
Miyata et al.

(10) Patent No.: US 7,158,298 B2
(45) Date of Patent: Jan. 2, 2007

(54) REAR PROJECTION SCREEN AND DIFFUSING SHEET

(75) Inventors: Hideki Miyata, Tokyo-To (JP); Katsunori Takahashi, Tokyo-To (JP)

(73) Assignee: Dai Nippon Printing Co., Ltd., Shinjuku-ku (JP)

( * ) Notice: Subject to any disclaimer, the term of this patent is extended or adjusted under 35 U.S.C. 154(b) by 62 days.

(21) Appl. No.: 10/892,485

(22) Filed: Jul. 16, 2004

(65) Prior Publication Data

US 2005/0018287 A1    Jan. 27, 2005

(30) Foreign Application Priority Data

Jul. 16, 2003 (JP) .............................. 2003-197878

(51) Int. Cl.
*G03B 21/60* (2006.01)
*G02B 3/08* (2006.01)

(52) U.S. Cl. ...................... 359/457; 359/453; 359/460; 359/742

(58) Field of Classification Search ........ 359/452–457, 359/460, 743, 742
See application file for complete search history.

(56) References Cited

U.S. PATENT DOCUMENTS

| | | | |
|---|---|---|---|
| 5,513,037 A * | 4/1996 | Yoshida et al. ............. | 359/457 |
| 5,751,478 A * | 5/1998 | Yoshimura et al. ......... | 359/453 |
| 6,049,423 A * | 4/2000 | Okuda ........................ | 359/453 |
| 6,271,965 B1 * | 8/2001 | Miyata ....................... | 359/453 |
| 6,665,118 B1 * | 12/2003 | Yamaguchi et al. ........ | 359/453 |
| 6,760,155 B1 * | 7/2004 | Murayama et al. ......... | 359/453 |
| 6,785,048 B1 * | 8/2004 | Yamaguchi et al. ........ | 359/453 |

FOREIGN PATENT DOCUMENTS

JP    11-133508    5/1999

* cited by examiner

*Primary Examiner*—W. B. Perkey
*Assistant Examiner*—Magda Cruz
(74) *Attorney, Agent, or Firm*—Oliff & Berridge, PLC

(57) ABSTRACT

Provided herein is a rear projection screen capable of displaying a sharper image by reducing deterioration in the image quality, such as coarsening, flickering and glaring. A rear projection screen 10 comprises a Fresnel lens sheet 11 having, on its light-entering-side surface, a Fresnel lens part 11a in the shape of a Fresnel lens. In the Fresnel lens sheet 11, both the Fresnel lens part 11a and a part (diffusing part 11b) situated on the light-emerging side of the Fresnel lens part 11a comprise light-diffusing particles P. The mean particle diameter of the light-diffusing particles P contained in the diffusing part 11b is not more than ⅓ of the lens pitch of the Fresnel lens part 11a.

14 Claims, 5 Drawing Sheets

REAR PROJECTION SCREEN AND DIFFUSING SHEET

BACKGROUND OF THE INVENTION

1. Field of the Invention

The present invention relates to a rear projection screen that is used as a component part of a rear projection system such as a projection television. More particularly, the present invention relates to a rear projection screen capable of displaying a sharper image by reducing deterioration which the displayed image undergoes, such as coarsening, flickering and glaring, and to a diffusing sheet for use in such a rear projection screen.

2. Background Art

A conventionally-known rear projection screen of the above-described type comprises: a diffusing part containing light-diffusing particles, provided for increasing the viewing angle; and a Fresnel lens part provided for decreasing the difference in screen brightness between the center and the edges. Another widely-known rear projection screen comprises, in addition to the above-described diffusing part and Fresnel lens part, a lenticular lens part that is provided to more finely control the viewing angle.

A projector for use in a rear projection system in which such a rear projection screen as is described above is incorporated has been improved in recent years and can now project image light with higher brightness and definition. Thanks to this improvement, the color purity of R, G and B light has been increased, and the emission wave range for each color is now getting narrower. As a result, the coherence (chances of causing interference) of image light tends to increase.

The Fresnel lens part contained in the above-described rear projection screen acts like a slit to make the brightness of light emerging from this lens part vary in coincidence with the concentric circular lenses on this lens part. Namely, in such a rear projection screen, when image light projected from a projector passes through the Fresnel lens part, the light rays emerging from the concentric circular lenses on the Fresnel lens part are to interfere with each other. Now, if the rays of such image light with high coherence as is described above pass through the Fresnel lens part and interfere with each other, the difference in intensity between the rays becomes greater, and the whole image displayed on the screen appears coarse, flickering or glaring.

Further, the above-described problem surfaces more clearly as the resolution of the projector becomes higher. There is now a heavy demand for measures to solve this problem.

In order to solve the image-glaring problem described above, there has been proposed a technique that a thin Fresnel lens sheet is supported by interposing it between a rigid light-diffusing sheet and a lenticular lens sheet (see Japanese Patent Laid-Open Publication No. 133508/1999).

This conventional technique, however, considerably restricts the construction of a rear projection screen, so that it has been difficult to freely make an optical design for a rear projection screen or a design for a rear-projection-screen-supporting mechanism. More specifically, this technique has the following two problems: (1) a rigid, thick light-diffusing sheet is used in addition to a Fresnel lens sheet and a lenticular lens sheet, and both surfaces of this light-diffusing sheet reflect incident light to cause loss of light, so that 8% or more of image light is lost to decrease the screen brightness; and (2) since a thin Fresnel lens sheet is interposed between the other optical sheets (a light-diffusing sheet and a lenticular lens sheet), this thin lens sheet readily wrinkles as the two optical sheets expand or shrink differently with changes in humidity or temperature; in order to overcome this drawback, it is necessary to specially devise a rear-projection-supporting mechanism.

SUMMARY OF THE INVENTION

It is possible to solve the above-described problem that the displayed image appears coarse, flickering or glaring, by providing, on the light-emerging side of the Fresnel lens part, a diffusing part containing light-diffusing particles. Namely, if light emerging from any one of the concentric circular lenses on the Fresnel lens part is diffused by the light-diffusing particles and its phase is thus diversified, this light interferes, in a wider range, with light emerging from other concentric circular lenses, being different from the first light in phase. Consequently, the image light, as a whole, appears uniform in intensity.

Assuming that the diffusing power is constant, it is necessary to incorporate light-diffusing particles into the diffusing part in a decreased amount if their diameters are large relative to the lens pitch of the Fresnel lens part. In this case, since light incident on the diffusing part hits the light-diffusing particles in a smaller number of times, the phase of the light changes only to a smaller extent, and non-uniformity in the intensity of the whole light, caused by interference, thus unfavorably remains. If the amount of these light-diffusing particles that are incorporated into the diffusing part is simply increased in order to cause light to hit the light-diffusing particles in an increased number of times, a darker image is displayed.

Assuming again that the diffusing power is constant, the amount of light-diffusing particles to be incorporated into the diffusing part can be made greater than that in the above-described case if the particle diameters of the light-diffusing particles are small relative to the lens pitch of the Fresnel lens part. In this case, the light-diffusing particles refract and reflect light incident on the diffusing part in an increased number of times. As a result, the change in phase of light (phase disturbance) also becomes greater.

On the basis of the above understanding, we continued our studies on the relationship between the lens pitch of a Fresnel lens part and the diameters of light-diffusing particles, and, as a result, found that deterioration in the image quality, such as coarsening, flickering and glaring, is drastically reduced when the mean particle diameter of the light-diffusing particles is made not more than $1/5$ of the lens pitch of the Fresnel lens part.

The present invention was accomplished on the basis of the above finding. An object of the present invention is, therefore, to provide a rear projection screen capable of displaying a sharper image by reducing deterioration which the displayed image undergoes, such as coarsening, flickering and glaring, and a diffusing sheet for use in such a rear projection screen.

The present invention provides, as a first means for fulfilling the above-described object of the invention, a rear projection screen comprising: a Fresnel lens part in the shape of a Fresnel lens; and a diffusing part provided on the light-emerging side of the Fresnel lens part, wherein the diffusing part contains light-diffusing particles whose mean particle diameter is not more than $1/5$ of the lens pitch of the Fresnel lens part.

In the above-described first means of the present invention, it is preferable that an optical sheet in which the diffusing part is provided be composed of a plurality of layers, and that, of these layers, a first diffusing layer that is the outermost layer on the light-emerging side, contains as first light-diffusing particles, light-diffusing particles whose mean particle diameter is not more than ⅕ of the lens pitch of the Fresnel lens part. It is preferable that, of the plurality of layers, a second diffusing layer that is situated on the light-entering side of the first diffusing layer contains as second light-diffusing particles, light-diffusing particles whose mean particle diameters are greater than those of the first light-diffusing particles.

Further, in the above-described first means of the invention, it is preferable that the light-diffusing particles be composed of two or more types of particles different in refractive index.

Furthermore, in the above-described first means of the invention, it is preferable that the lens pitch of the Fresnel lens part be 120 μm or less and that the mean particle diameter of the light-diffusing particles be 24 μm or less.

Furthermore, in the first means of the invention, it is preferable that the Fresnel lens part be provided on the light-emerging-side surface of an optical sheet, the optical sheet having, on the light-entering-side surface thereof, a vertical control lens part for controlling the vertical viewing angle, that the vertical control lens part be a vertical diffusion lenticular lens or prism part that extends in the horizontal direction and diffuses light in the vertical direction, and that the vertical control lens part has a lens pitch of 5 times or more the mean particle diameter of the light-diffusing particles.

Furthermore, in the first means of the invention, it is preferable that the diffusing part be provided on an optical sheet having a horizontal control lens part for controlling the horizontal viewing angle, and that the horizontal control lens part be a horizontal diffusion lenticular lens or prism part that extends in the vertical direction and diffuses light in the horizontal direction.

The present invention provides, as a second means for fulfilling the object of the invention, a diffusing sheet that is incorporated in a rear projection screen comprising a Fresnel lens part in the shape of a Fresnel lens and is placed on the light-emerging side of the Fresnel lens part, wherein the diffusing sheet comprises a diffusing part containing light-diffusing particles whose mean particle diameter is not more than ⅕ of the lens pitch of the Fresnel lens part.

In the above-described second means of the present invention, it is preferable that the diffusing sheet be composed of a plurality of layers, and that, of these layers, a first diffusing layer that is the outermost layer on the light-emerging side, contains as first light-diffusing particles, light-diffusing particles whose mean particle diameter is not more than ⅕ of the lens pitch of the Fresnel lens part.

Further, in the above-described second means of the invention, it is preferable that, of the plurality of layers, a second diffusing layer that is situated on the light-entering side of the first diffusing layer contains as second light-diffusing particles, light-diffusing particles whose particle diameters are greater than those of the first light-diffusing particles.

Furthermore, in the above-described second means of the invention, it is preferable that the light-diffusing particles be composed of two or more types of particles different in refractive index.

Furthermore, in the second means of the present invention, it is preferable that the mean particle diameter of the light-diffusing particles be 24 μm or less.

Furthermore, in the second means of the invention, it is preferable that the diffusing sheet further comprises a horizontal diffusion lenticular lens or prism part that extends in the vertical direction and diffuses light in the horizontal direction.

According to the present invention, since the diffusing part, which is provided on the light-emerging side of the Fresnel lens part in the shape of a Fresnel lens, contains light-diffusing particles whose mean particle diameter is not more than ⅕ of the lens pitch of the Fresnel lens part, it can effectively reduce deterioration in the image quality that is caused by the Fresnel lens part, such as coarsening, flickering and glaring, and the rear projection screen can thus display an image sharper than ever.

Further, according to the present invention, if the optical sheet in which the diffusing part is provided is composed of a plurality of layers, and, of these layers, the first diffusing layer that is the outermost layer on the light-emerging side, is made to contain light-diffusing particles (first light-diffusing particles) whose mean particle diameter is not more than ⅕ of the lens pitch of the Fresnel lens part, it becomes possible to effectively reduce deterioration in the quality of the image finally obtained, such as coarsening. If the second diffusing layer that is situated on the light-entering side of the first diffusing layer is made to contain second light-diffusing particles whose particle diameters are greater than those of the first light-diffusing particles, it becomes possible to satisfactorily reduce deterioration in the image quality, such as coarsening, while keeping the production cost low by minimizing the amount of the first light-diffusing particles that require classification.

Furthermore, according to the present invention, if the light-diffusing particles are composed of two or more types of particles different in refractive index, it is possible to enhance the effect of reducing deterioration in the image quality, such as coarsening.

Furthermore, according to the present invention, if the lens pitch of the Fresnel lens part is made 120 μm or less (i.e., the mean particle diameter of the light-diffusing particles is made 24 μm or less), it becomes possible to reduce, on a rear projection screen of almost every size, deterioration in the image quality, such as coarsening.

Furthermore, according to the present invention, if the vertical control lens part (vertical diffusion lenticular lens or prism part) for controlling the vertical viewing angle, provided on the light-entering-side surface of the optical sheet, the optical sheet having, on its light-emerging-side surface, the Fresnel lens part, is made to have a lens pitch that is 5 times or more the mean particle diameter of the light-diffusing particles, it becomes possible to reduce deterioration in the image quality, such as coarsening, while controlling the vertical viewing angle.

Furthermore, according to the present invention, if a horizontal control lens part (horizontal diffusion lenticular lens or prism part) for controlling the horizontal viewing angle is provided on the optical sheet having the diffusing part, it becomes possible to maintain the screen brightness perceived when the screen is viewed from the front, while keeping the horizontal viewing angle greater.

DETAILED DESCRIPTION OF PREFERRED EMBODIMENTS

By referring to the accompanying drawings, embodiments of the present invention will be described hereinafter.

(First Embodiment)

First of all, the first embodiment of the present invention will be described with reference to FIGS. 1A and 1B.

Figure 1A:
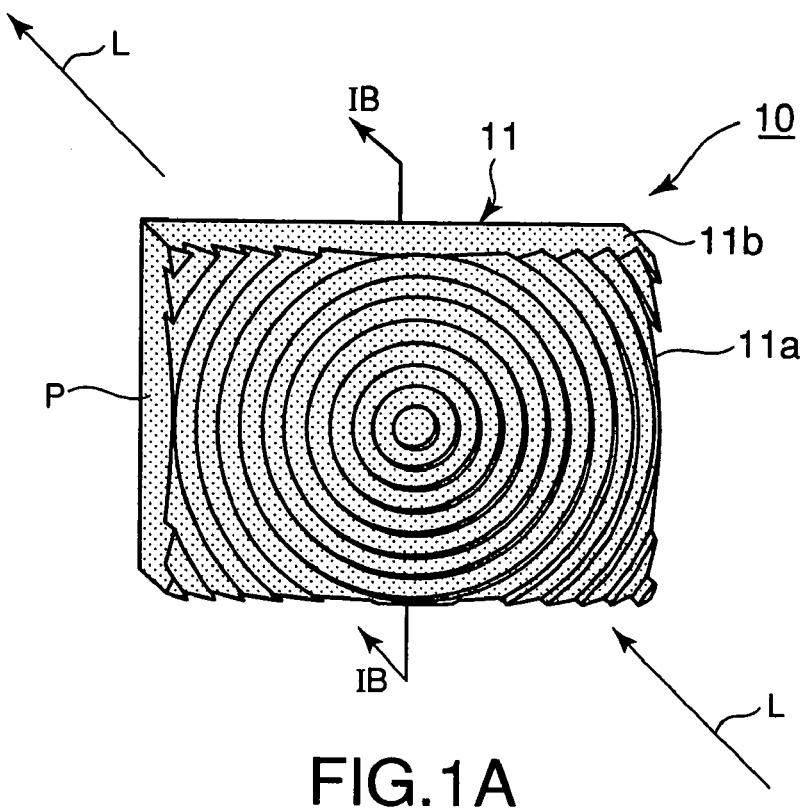
FIG. 1A is a perspective view showing a rear projection screen according to the first embodiment of the present invention.
Figure 1B:
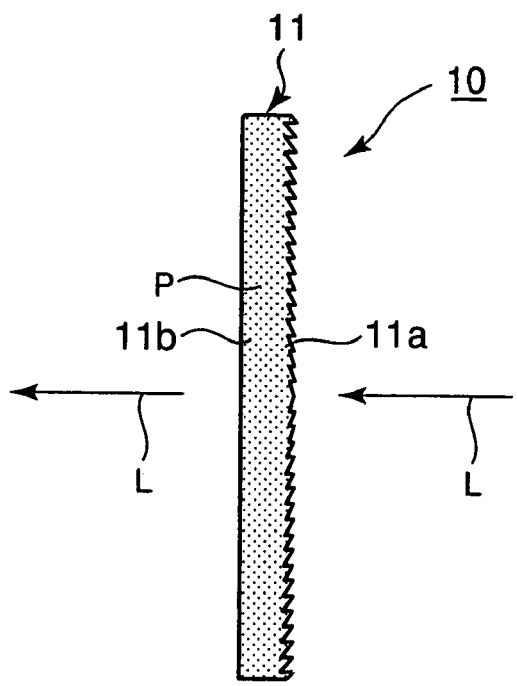
FIG. 1B is a vertical section of the rear projection screen shown in FIG. 1A, taken along line IB—IB in FIG. 1A.

As shown in FIGS. 1A and 1B, a rear projection screen 10 according to the first embodiment of the invention comprises a Fresnel lens sheet 11 having, on its light-entering-side surface, a Fresnel lens part 11a. In FIGS. 1A and 1B, the arrow indicates the direction in which image light L travels, and the Fresnel lens part 11a and light-diffusing particles P contained in it are depicted exaggeratedly in their dimensions.

The Fresnel lens sheet 11 has the function of condensing image light L because of the shape of the Fresnel lens part 11a, and the Fresnel lens part 11a and a part (diffusing part 11b) that is situated on the light-emerging side of the Fresnel lens part 11a contain light-diffusing particles P. The mean particle diameter of the light-diffusing particles P contained in the diffusing part 11b is not more than 1/5 of the lens pitch of the Fresnel lens part 11a. Although the Fresnel lens sheet 11, as a whole, serves as a diffusing part because of the light-diffusing particles P entirely dispersed in it, the part of the Fresnel lens sheet 11, situated on the light-emerging side of the Fresnel lens part 11a, is herein referred to as the diffusing part 11b for convenience' sake.

The type of the light-diffusing particles P to be used is selected by taking, into consideration, the difference in refractive index between the light-diffusing particles P and a base material (e.g., resins such as acrylic resins, polycarbonate resins, polystyrene resins, acryl-styrene copolymer resins) in which the light-diffusing particles P will be dispersed. Specific examples of light-diffusing particles P that can be used herein include organic finely-divided particles of acrylic resins, styrene resins, acryl-styrene copolymer resins and silicone resins, and inorganic finely-divided particles of glass, barium sulfate, aluminum hydroxide, calcium carbonate, silica (silicon dioxide) and titanium oxide.

The light-diffusing particles P may be in any shape (perfectly spherical, roughly spherical, amorphous, etc.). It is, however, preferable that the light-diffusing particles P be perfectly or roughly spherical because perfectly or roughly spherical light-diffusing particles can decrease the amount of image light L that is backscattered.

The light-diffusing particles P may be composed of two or more types of particles different in refractive index. In this case, emerging light is diffused at angles in a wider range, so that it becomes possible to cause, in a wider range, interference of light with diversified phases. It is, therefore, possible to enhance the effect of reducing deterioration in the image quality, such as coarsening.

In the rear projection screen 10 shown in FIGS. 1A and 1B, the lens pitch of the Fresnel lens part 11a provided on the Fresnel lens sheet 11 is preferably 120 μm or less, and the mean particle diameter of the light-diffusing particles P is preferably 24 μm or less. If the lens pitch and the mean particle diameter are so made, those bright-and-dark lines that are produced by the scanning lines of a projector can be made thinner by the Fresnel lens with a smaller lens pitch, and the phase of the emerging light can thus be diversified. Experiments were conducted in order to find the optimum relationship between the scanning line pitch and the Fresnel lens pitch. As a result, it has been found that deterioration which an image displayed undergoes, such as coarsening, is drastically reduced when the lens pitch of the Fresnel lens is made not more than 1/3 of the scanning line pitch. That the lens pitch of the Fresnel lens part 11a is 120 μm or less is equivalent to that this lens pitch is not more than 1/3 of the scanning line pitch at the time when an HD (high definition) image is projected, for example, on a 40-inch wide screen. Therefore, by making the lens pitch of the Fresnel lens part 11a, 120 μm or less (i.e., by making the mean particle diameter of the light-diffusing particles P, 24 μm or less), as described above, it is possible to reduce, on a rear projection screen of almost every size, deterioration in the image quality, such as coarsening.

(Second Embodiment)

Figure 2A:
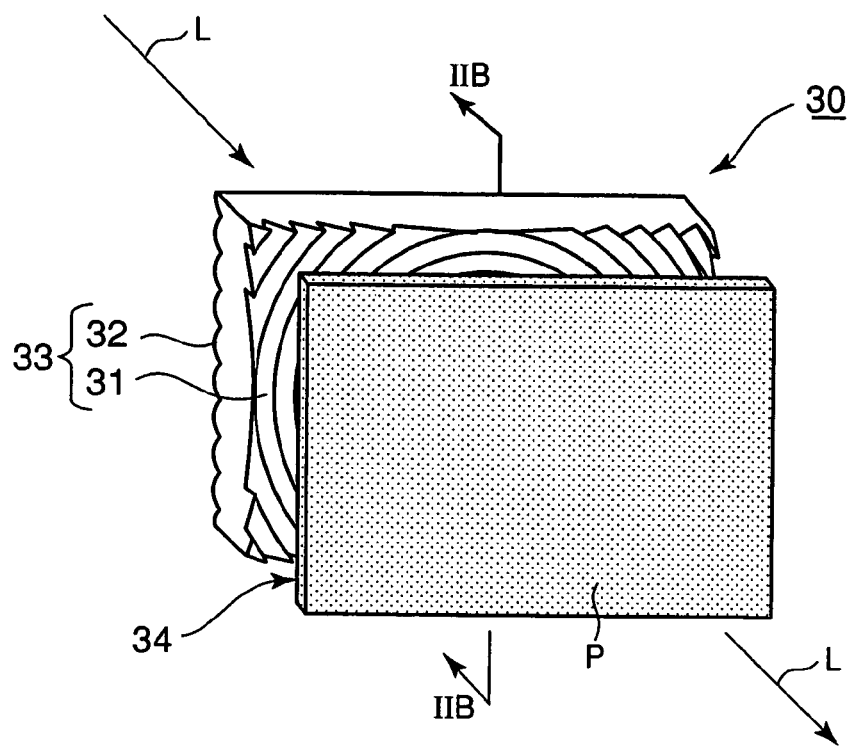
FIG. 2A is a perspective view showing a rear projection screen according to the second embodiment of the present invention.
Figure 2B:
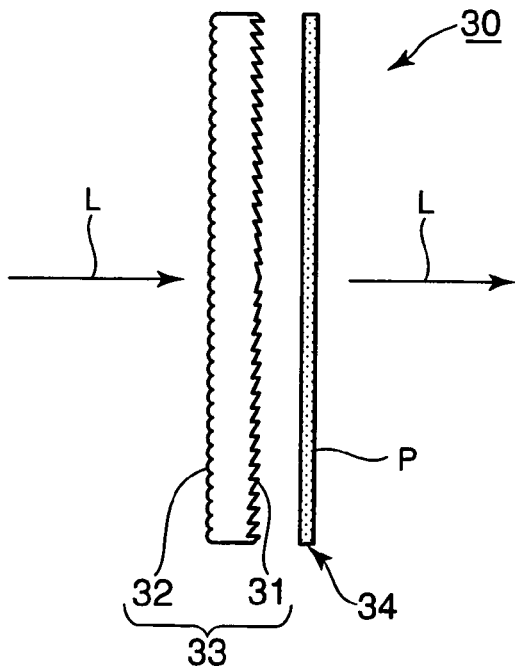
FIG. 2B is a vertical section of the rear projection screen shown in FIG. 2A, taken along line IIB—IIB in FIG. 2A.

Next, the second embodiment of the present invention will be described with reference to FIGS. 2A and 2B. The second embodiment of the invention is almost identical with the first embodiment shown in FIGS. 1A and 1B, except that the Fresnel lens part and the diffusing part are separately provided on different optical sheets and that a vertical control lens part for controlling the vertical viewing angle is provided on the light-entering side of the Fresnel lens part. In FIGS. 2A and 2B showing the second embodiment and in FIGS. 1A and 1B showing the first embodiment, like reference numerals designate like parts, and detailed explanations for these parts are herein omitted.

As shown in FIGS. 2A and 2B, a rear projection screen 30 according to the second embodiment of the present invention comprises: a Fresnel lens sheet 33 having, on its light-emerging-side surface, a Fresnel lens part 31; and a diffusing sheet 34 provided on the light-emerging side of the Fresnel lens sheet 33.

Of these two sheets, the Fresnel lens sheet 33 acts to condense image light L because of the shape of the Fresnel lens part 31, and has, on its light-entering-side surface, a vertical control lens part 32 for controlling the vertical viewing angle. The vertical control lens part 32 extends in the horizontal direction and diffuses light in the vertical direction. It is preferable that the vertical control lens part 32 be a vertical diffusion lenticular lens or prism part.

The diffusing sheet 34 has the function of diffusing image light L owing to the light-diffusing particles P contained in it. The mean particle diameter of the light-diffusing particles P contained in the diffusing sheet 34 is not more than 1/5 of the lens pitch of the Fresnel lens part 31 of the Fresnel lens sheet 33. The diffusing sheet 34, as a whole, serves as a diffusing part because of the light-diffusing particles P entirely dispersed in it.

The lens pitch of the vertical control lens part 32 that is provided on the light-entering side of the Fresnel lens part 31 of the Fresnel lens sheet 33 is preferably 5 times or more the mean particle diameter of the light-diffusing particles P. Therefore, even if the brightness of the image light L is made non-uniform by the vertical control lens part 32, as it is made non-uniform by the Fresnel lens part 31, it is possible to more effectively reduce deterioration, such as coarsening, that is caused by the vertical control lens part 32 in the image displayed. Experiments were conducted in order to find the optimum relationship between the lens pitch of the vertical control lens part 32 and the mean particle diameter of the light-diffusing particles P. As a result, it has been confirmed that deterioration in the image quality, such as coarsening, is drastically reduced when the lens pitch of the vertical control lens part 32 is made 5 times or more the mean particle diameter of the light-diffusing particles P, as mentioned above.

(Third Embodiment)

Figure 3A:
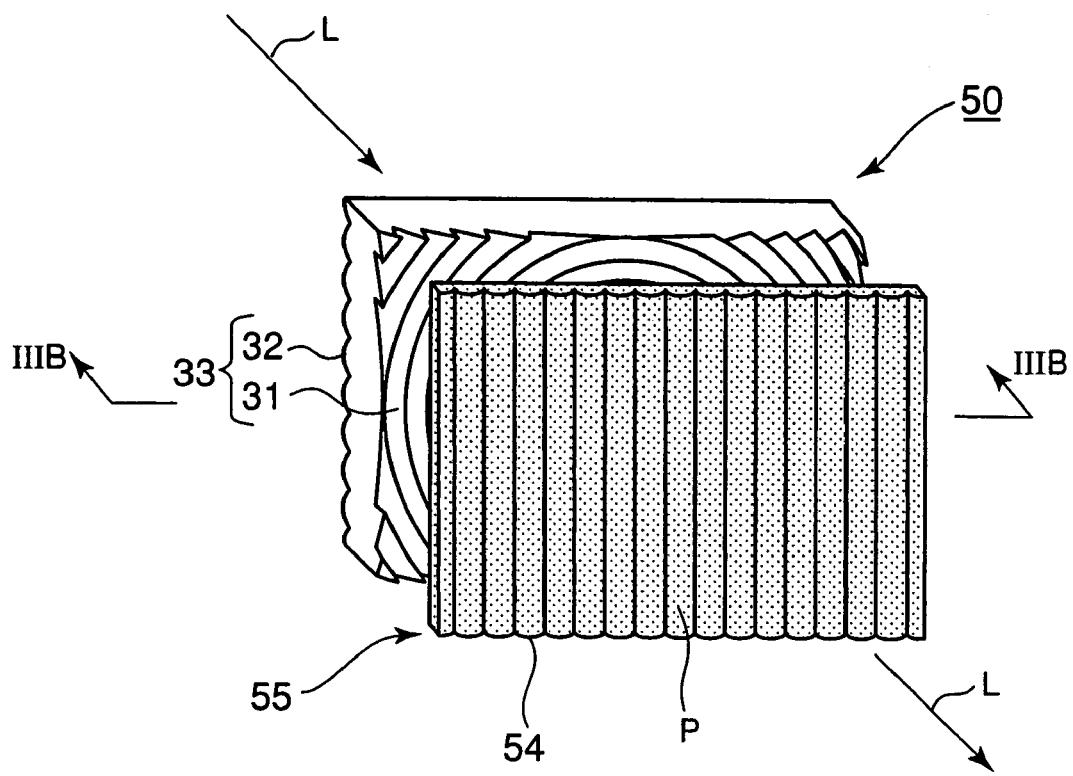
FIG. 3A is a perspective view showing a rear projection screen according to the third embodiment of the present invention.
Figure 3B:
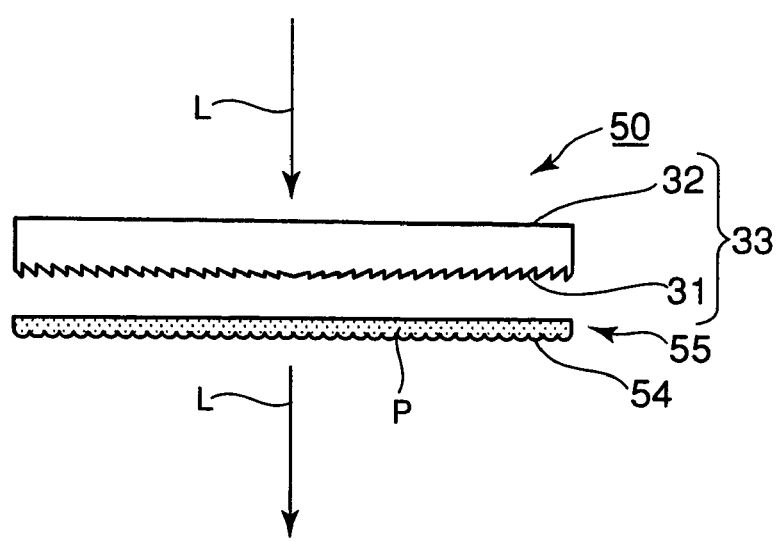
FIG. 3B is a cross section of the rear projection screen shown in FIG. 3A, taken along line IIIB—IIIB in FIG. 3A.

Next, the third embodiment of the present invention will be described with reference to FIGS. 3A and 3B. The third embodiment of the invention is almost the same as the second embodiment shown in FIGS. 2A and 2B, except that a horizontal control lens part for controlling the horizontal viewing angle is provided on the light-emerging-side surface of the optical sheet (diffusing sheet), the optical sheet having, on the other surface, the diffusing part. In FIGS. 3A and 3B showing the third embodiment and in FIGS. 2A and 2B showing the second embodiment, like reference numerals designate like parts, and detailed explanations for these parts are herein omitted.

As shown in FIGS. 3A and 3B, a rear projection screen 50 according to the third embodiment of the present invention comprises: a Fresnel lens sheet 33 having, on its light-emerging-side surface, a Fresnel lens part 31 and, on its light-entering-side surface, a vertical control lens part 32; and a diffusing sheet 55 provided on the light-emerging side of the Fresnel lens sheet 33.

Of these two sheets, the diffusing sheet 55 has the function of diffusing image light L because of light-diffusing particles P contained in it. The mean particle diameter of the light-diffusing particles P contained in the diffusing sheet 55 is not more than ⅕ of the lens pitch of the Fresnel lens part 31 of the Fresnel lens sheet 33. The diffusing sheet 55, as a whole, serves as a diffusing part owing to the light-diffusing particles P that are entirely dispersed in it.

The diffusing sheet 55 has, on its light-emerging-side surface, a horizontal control lens part 54 for controlling the horizontal viewing angle. The horizontal control lens part 54 extends in the vertical direction and diffuses light in the horizontal direction. It is preferable that the horizontal control lens part 54 be a horizontal diffusion lenticular lens or prism part. By thus controlling the horizontal viewing angle by means of the horizontal control lens part 54 that is provided on the light-emerging-side surface of the diffusing sheet 55, it is possible to control the diffusing properties in the horizontal direction independently from those in the vertical direction. For this reason, it is possible to maintain the screen brightness perceived when the screen is viewed from the front, while keeping the horizontal viewing angle greater.

(Fourth Embodiment)

Figure 4A:
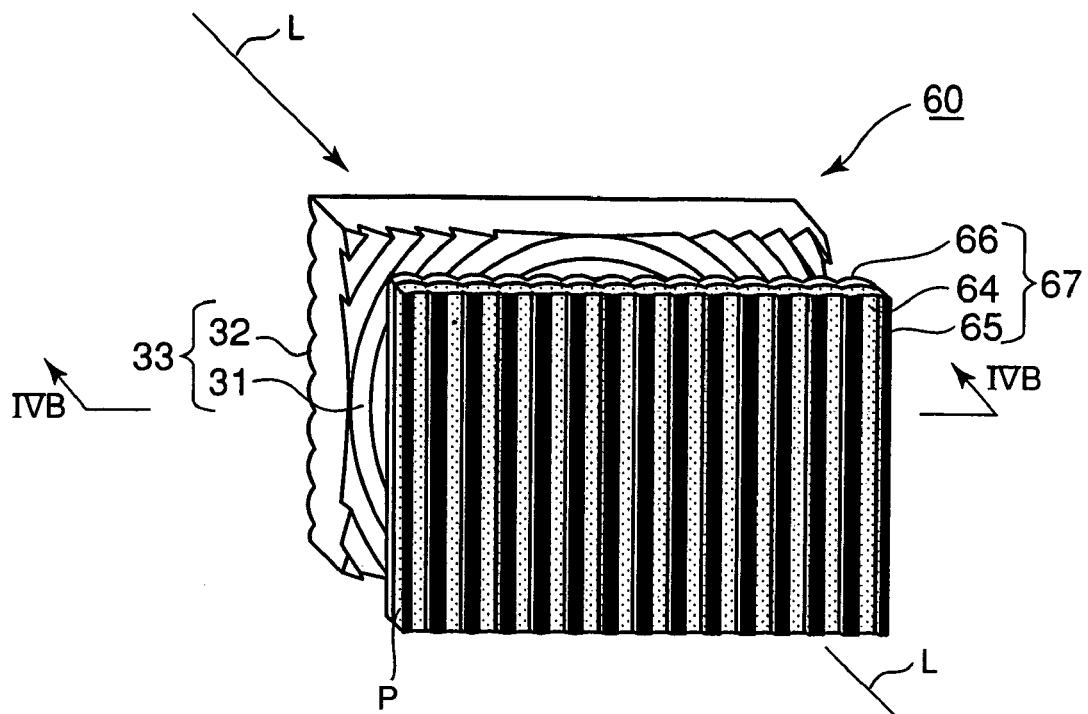
FIG. 4A is a perspective view showing a rear projection screen according to the fourth embodiment of the present invention.
Figure 4B:
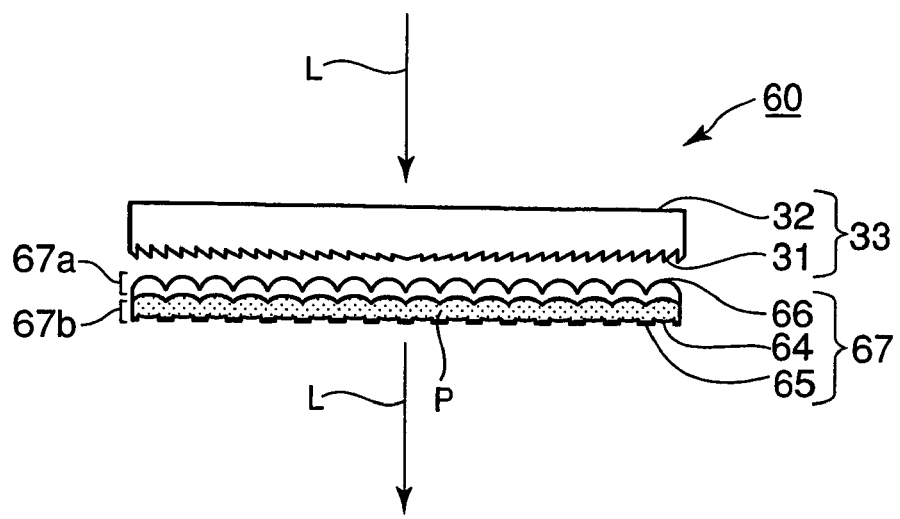
FIG. 4B is a cross section of the rear projection screen shown in FIG. 4A, taken along line IVB—IVB in FIG. 4A.

Next, the fourth embodiment of the present invention will be described with reference to FIGS. 4A and 4B. The fourth embodiment of the invention is almost identical with the third embodiment shown in FIGS. 3A and 3B, except that the optical sheet having the diffusing part is a double-sided lenticular lens sheet, that this double-sided lenticular lens sheet is composed of a plurality of layers, and that, of these layers, the outermost layer on the light-emerging side contains light-diffusing particles whose mean particle diameter is not more than ⅕ of the lens pitch of the Fresnel lens part. In FIGS. 4A and 4B showing the fourth embodiment and in FIGS. 3A and 3B showing the third embodiment, like reference numerals designate like parts, and detailed explanations for these parts are herein omitted.

As shown in FIGS. 4A and 4B, a rear projection screen 60 according to the fourth embodiment of the present invention comprises: a Fresnel lens sheet 33 having, on its light-emerging-side surface, a Fresnel lens part 31 and, on its light-entering-side surface, a vertical control lens part 32; and a double-sided lenticular lens sheet 67 that is provided on the light-emerging side of the Fresnel lens sheet 33.

Of these two sheets, the double-sided lenticular lens sheet 67 has, on its light-entering-side surface, a first lens layer 67a, and a second lens layer 67b on the light-emerging side of the first lens layer 67a.

The first lens layer 67a has, on its light-entering-side surface, a first lenticular lens part 66 having lenticular lenses extending in the vertical direction.

The second lens layer 67b has, on its light-emerging-side surface, a second lenticular lens part 64 having lenticular lenses extending in the vertical direction, and, on the non-light-emerging parts of the light-emerging-side surface, from which light does not emerge, extraneous-light-absorbing parts 65.

Of these two lens layers, the second lens layer (first diffusing layer) 67b, the outermost layer on the light-emerging side, preferably contains light-diffusing particles P whose mean particle diameter is not more than ⅕ of the lens pitch of the Fresnel lens part 31. Further, although the first lens layer 67a may contain no light-diffusing particles, it may contain light-diffusing particles with any mean particle diameter (a mean particle diameter of either ⅕ or less or ⅕ or more of the lens pitch of the Fresnel lens part 31).

(Fifth Embodiment)

Figure 5A:
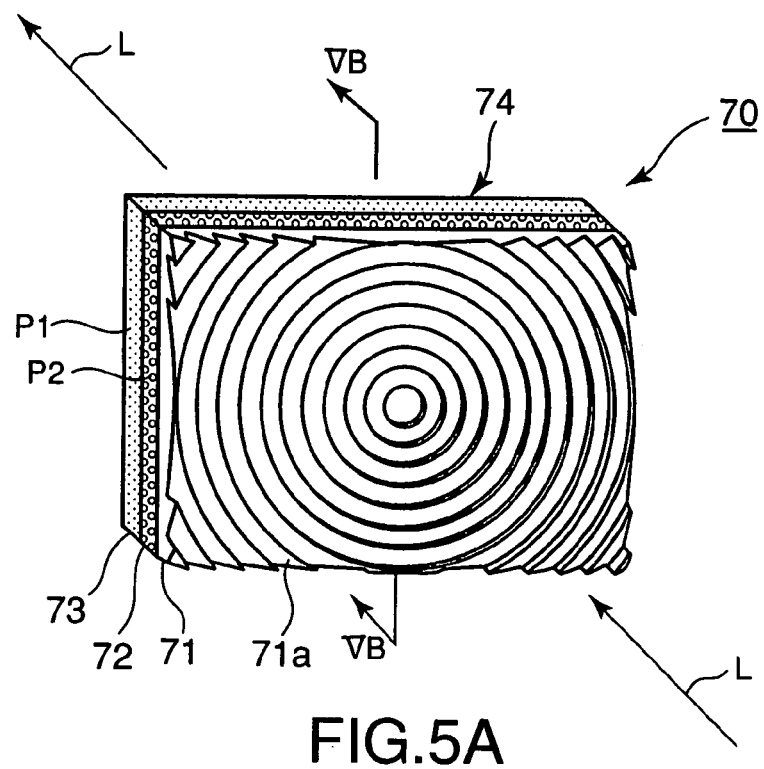
FIG. 5A is a perspective view showing a rear projection screen according to the fifth embodiment of the present invention.
Figure 5B:
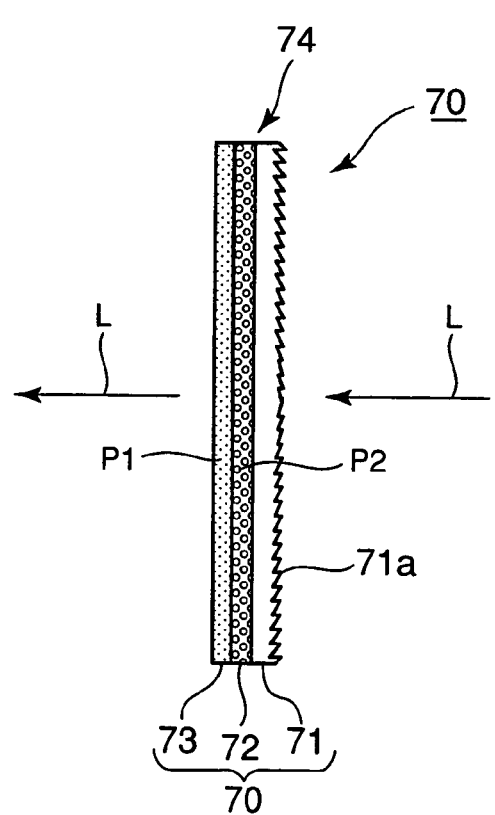
FIG. 5B is a vertical section of the rear projection screen shown in FIG. 5A, taken along line VB—VB in FIG. 5A.

Next, the fifth embodiment of the present invention will be described with reference to FIGS. 5A and 5B. The fifth embodiment of the invention is almost the same as the first embodiment shown in FIGS. 1A and 1B, except that the optical sheet (Fresnel lens sheet) having the diffusing part is composed of a plurality of layers, that, of these layers, the outermost layer (first diffusing layer) on the light-emerging side contains light-diffusing particles (first light-diffusing particles) whose mean particle diameter is not more than ⅕ of the lens pitch of the Fresnel lens part, and that a layer (second diffusing layer) provided on the light-entering side of the first diffusing layer contains light-diffusing particles (second light-diffusing particles) whose particle diameters are greater than those of the first light-diffusing particles. In FIGS. 5A and 5B showing the fifth embodiment and in FIGS. 1A and 1B showing the first embodiment, like reference numerals designate like parts, and detailed explanations for these parts are herein omitted.

As shown in FIGS. 5A and 5B, a rear projection screen 70 according to the fifth embodiment of the present invention comprises a three-layered Fresnel lens sheet 74.

The Fresnel lens sheet 74 is composed of a Fresnel lens layer 71 having, on its light-entering-side surface, a Fresnel lens part 71a, and a two-layered diffusing part (diffusing layers 72 and 73) on the light-emerging side of the Fresnel lens layer 71.

In the two-layered diffusing part, the first diffusing layer 73 situated on the light-emerging side contains light-diffusing particles (first light-diffusing particles) P1 whose mean particle diameter is not more than ⅕ of the lens pitch of the Fresnel lens part. The second diffusing layer 72 situated on the light-entering side of the first diffusing layer 73 contains light-diffusing particles (second light-diffusing particles) P2 whose particle diameters are greater than those of the light-diffusing particles P1.

In general, it is necessary to subject, to classification, light-diffusing particles to be incorporated into a diffusing part, in order to make their particle diameters uniform. Classification, however, requires much labor and time, and, as a result, boosts the production cost appreciably. In the rear projection screen 70 shown in FIGS. 5A and 5B, the diffusing properties can be obtained to some extent owing to the non-classified light-diffusing particles P2 contained in the second diffusing layer 72, while the phase of light is varied by the light-diffusing particles P1 contained in the first diffusing layer 73, classified to have a predetermined mean particle diameter (a mean particle diameter of not more than ⅕ of the lens pitch of the Fresnel lens part 71), thereby reducing deterioration in the image quality, such as coarsening. For this reason, the particle diameters of all the light-diffusing particles P1 and P2 contained in the two-layered diffusing part (diffusing layers 72 and 73) are not needed to be made uniform. The rear projection screen 70 capable of displaying an image that is effectively prevented from undergoing deterioration such as coarsening can thus be produced more inexpensively.

In the above-described rear projection screens 10, 30, 50, 60 and 70 according to the first to fifth embodiments of the present invention, a variety of optical sheets may be provided on the light-entering side of the optical sheets 11, 33 and 74 having the Fresnel lens parts 11a, 31 and 71a, respectively. For example, an optical sheet having a diffusing part containing light-diffusing particles may be provided. There is no particular limitation on the size of the light-diffusing particles to be incorporated into the diffusing part of such an optical sheet that is provided on the light-entering side of the optical sheets 11, 33 and 74.

EXAMPLES

The above-described first to fifth embodiments of the invention will now be explained more specifically by referring to the following Examples and Comparative Examples.

Example 1

A rear projection screen of Example 1 is equivalent to the rear projection screen 10 shown in FIGS. 1A and 1B.

An acrylic sheet (refractive index 1.49) containing 20% by weight of spherical, cross-linked styrene beads (light-diffusing particles) with a mean particle diameter of 27 μm and a refractive index of 1.59 was firstly prepared. By a hot pressing method, this acrylic sheet was shaped into a Fresnel lens sheet (rear projection screen) having, on its light-entering-side surface, a Fresnel lens part with a lens pitch of 145 μm. It is noted that, in this Example, the light-diffusing particles are entirely dispersed in the rear projection screen.

This rear projection screen of Example 1 was mounted in a 60-inch projection television set (hereinafter referred to as "PTV"), and the image displayed was visually observed. Deterioration in the image quality, such as coarsening, was scarcely found in the image displayed, and the image appeared smooth.

Example 2

A rear projection screen of Example 2 was the same as that of Example 1, except that the lens pitch of the Fresnel lens part and the mean particle diameter of the light-diffusing particles in Example 1 were changed as described below.

An acrylic sheet (refractive index 1.49) containing 20% by weight of spherical, cross-linked styrene beads (light-diffusing particles) with a mean particle diameter of 18 μm and a refractive index of 1.59 was firstly prepared. By a hot pressing method, this acrylic sheet was shaped into a Fresnel lens sheet (rear projection screen) having, on its light-entering-side surface, a Fresnel lens part with a lens pitch of 95 μm.

This rear projection screen of Example 2 was mounted in a 60-inch PTV, and the image displayed was visually observed. The image was better than that observed in Example 1 in terms of deterioration in the image quality, such as coarsening, and appeared very smooth.

Example 3

A rear projection screen of Example 3 is equivalent to the rear projection screen 30 shown in FIGS. 2A and 2B.

By a hot pressing method, an acrylic sheet (refractive index 1.49) was shaped into a Fresnel lens sheet having, on its light-emerging-side surface, a Fresnel lens part with a lens pitch of 110 μm, and, on its light-entering-side surface, a vertical diffusion lenticular lens part with a lens pitch of 100 μm.

On the other hand, a diffusing sheet containing, in an acrylic base material (refractive index 1.49), 12% by weight of spherical, cross-linked acryl-styrene copolymer resin beads (light-diffusing particles) with a mean particle diameter of 20 μm and a refractive index of 1.56 was prepared by extrusion molding.

The above-prepared Fresnel lens sheet and diffusing sheet were combined into a rear projection screen.

This rear projection screen of Example 3 was mounted in a 60-inch PTV, and the image displayed was visually observed. Deterioration in the image quality, such as coarsening, was scarcely found in the image displayed, and the image appeared smooth. In addition, the vertical viewing angle was found increased.

Example 4

A rear projection screen of Example 4 is the same as that of Example 3, except that the light-diffusing particles were incorporated in a manner different from that in Example 3.

By a hot pressing method, an acrylic sheet (refractive index 1.49) was shaped into a Fresnel lens sheet having, on its light-emerging-side surface, a Fresnel lens part with a lens pitch of 110 μm, and, on its light-entering-side surface, a vertical diffusion lenticular lens part with a lens pitch of 100 μm.

On the other hand, a diffusing sheet containing, in an acrylic base material (refractive index 1.49), 6% by weight of spherical, cross-linked acryl-styrene copolymer resin beads (first light-diffusing particles) with a mean particle diameter of 20 µm and a refractive index of 1.51 and 8% by weight of spherical, cross-linked styrene beads (second light-diffusing particles) with a mean particle diameter of 9 µm and a refractive index of 1.59 was prepared by extrusion molding. It is noted that, in this Example, the first and second light-diffusing particles are dispersed in one layer.

The above-prepared Fresnel lens sheet and diffusing sheet were combined into a rear projection screen.

This rear projection screen of Example 4 was mounted in a 60-inch PTV, and the image displayed was visually observed. The image was better than that observed in Example 3 in terms of deterioration in the image quality, such as coarsening, and appeared very smooth.

Example 5

A rear projection screen of Example 5 is equivalent to the rear projection screen 50 shown in FIGS. 3A and 3B.

By a hot pressing method, an acrylic sheet (refractive index 1.49) was shaped into a Fresnel lens sheet having, on its light-emerging-side surface, a Fresnel lens part with a lens pitch of 110 µm, and, on its light-entering-side surface, a vertical diffusion lenticular lens part with a lens pitch of 100 µm.

On the other hand, a diffusing sheet having, on its light-emerging-side surface, a horizontal diffusion lenticular lens part with a lens pitch of 250 µm was prepared by extrusion molding. This diffusing sheet was made to contain, in an acrylic base material (refractive index 1.49), 1.7% by weight of spherical, cross-linked acryl-styrene copolymer resin beads (first light-diffusing particles) with a mean particle diameter of 20 µm and a refractive index of 1.51 and 3% by weight of spherical, cross-linked styrene beads (second light-diffusing particles) with a mean particle diameter of 9 µm and a refractive index of 1.59.

The above-prepared Fresnel lens sheet and diffusing sheet were combined into a rear projection screen.

This rear projection screen of Example 5 was mounted in a 60-inch PTV, and the image displayed was visually observed. Like in Example 3, deterioration in the image quality, such as coarsening, was not found in the image displayed, and the image appeared smooth. Moreover, the vertical and horizontal viewing angles were found increased, and it thus became possible to observe the image from directions in a wider range of angle.

Example 6

A rear projection screen of Example 6 is equivalent to the rear projection screen 60 shown in FIGS. 4A and 4B.

By a hot pressing method, an acrylic sheet (refractive index 1.49) was shaped into a Fresnel lens sheet having, on its light-emerging-side surface, a Fresnel lens part with a lens pitch of 110 µm, and, on its light-entering-side surface, a vertical diffusion lenticular lens part with a lens pitch of 100 µm.

On the other hand, a double-sided lenticular lens sheet consisting of first and second lens layers was prepared by extrusion molding. The first lens layer was made to have, on its light-entering-side surface, a first lenticular lens part with a lens pitch of 530 µm. The base material of the first lens layer was an acrylic resin (refractive index 1.49), and no light-diffusing particles were dispersed in this base material. The second lens layer situated on the light-emerging side of the first lens layer was made to have, on its light-emerging-side surface, a second lenticular lens part having lenticular lenses with a width of 320 µm, and, on the non-light-emerging parts of the light-emerging-side surface, extraneous-light-absorbing parts with a width of 210 µm. The base material of the second lens layer was an acrylic resin (refractive index 1.49), and in this base material were dispersed 2% by weight of spherical, cross-linked acryl-styrene copolymer resin beads (first light-diffusing particles) with a mean particle diameter of 20 µm and a refractive index of 1.51 and 2% by weight of spherical, cross-linked styrene beads (second light-diffusing particles) with a mean particle diameter of 9 µm and a refractive index of 1.59.

The above-prepared Fresnel lens sheet and double-sided lenticular lens sheet were combined into a rear projection screen.

This rear projection screen of Example 6 was mounted in a 60-inch PTV, and the image displayed was visually observed. The image was better than that observed in Example 3 in terms of deterioration in the image quality, such as coarsening, and appeared very smooth. Moreover, the vertical and horizontal viewing angles were found increased, and it thus became possible to observe, from directions in a wider range of angle, the image as being uniform in color. In addition, the image was found to have high contrast.

Example 7

A rear projection screen of Example 7 is equivalent to the rear projection screen 70 shown in FIGS. 5A and 5B.

An acrylic sheet (refractive index 1.49) consisting of first and second diffusing layers was firstly prepared. The first diffusing layer was made to have a thickness of 0.5 mm and to contain 10% by weight of spherical, cross-linked styrene beads (first light-diffusing particles) with a mean particle diameter of 18 µm and a refractive index of 1.59. The second diffusing layer was made to have a thickness of 1.5 mm and to contain 8% by weight of cross-linked acryl-styrene copolymer resin beads (second light-diffusing particles) with a mean particle diameter of 40 µm and a refractive index of 1.53. An ultraviolet-curing resin was applied to the second diffusing layer in the acrylic sheet and was shaped into a Fresnel lens part with a lens pitch of 95 µm by an ultraviolet-light forming method. Thus, a Fresnel lens sheet (rear projection screen) composed of the first diffusing layer, the second diffusing layer, and the Fresnel lens part was obtained.

This rear projection sheet of Example 7 was mounted in a 60-inch PTV, and the image displayed was visually observed. The image was poorer than that observed in Example 1 in terms of deterioration in the image quality, such as coarsening, but even so, it was much better than the images displayed on conventional rear projection screens, and appeared satisfactorily smooth. In addition, it was possible to produce the rear projection screen of Example 7 quite inexpensively as compared with the production of the rear projection screen of Example 1.

Comparative Example 1

An acrylic sheet (refractive index 1.49) containing 20% by weight of spherical, cross-linked styrene beads (light-diffusing particles) with a mean particle diameter of 150 µm and a refractive index of 1.59 was prepared. By a hot pressing method, this acrylic sheet was shaped into a Fresnel lens sheet (rear projection screen) having a Fresnel lens part with a lens pitch of 145 µm.

This rear projection screen of Comparative Example 1 was mounted in a 60-inch PTV, and the image displayed was visually observed. The image was found to be very coarse.

Comparative Example 2

By a hot pressing method, an acrylic sheet (refractive index 1.49) was shaped into a Fresnel lens sheet having, on its light-emerging-side surface, a Fresnel lens part with a lens pitch of 110 μm, and, on its light-entering-side surface, a vertical diffusion lenticular lens part with a lens pitch of 100 μm.

On the other hand, a diffusing sheet containing, in an acrylic base material (refractive index 1.49), 14% by weight of spherical, cross-linked acryl-styrene copolymer resin beads with a mean particle diameter of 65 μm and a refractive index of 1.56 was prepared by extrusion molding.

The above-prepared Fresnel lens sheet and diffusing sheet were combined into a rear projection screen. This rear projection screen of Comparative Example 2 was mounted in a 60-inch PTV, and the image displayed was visually observed. The image was found to be very coarse.

Comparative Example 3

By a hot pressing method, an acrylic sheet (refractive index 1.49) was shaped into a Fresnel lens sheet having, on its light-emerging side surface, a Fresnel lens part with a lens pitch of 110 μm, and, on its light-entering-side surface, a vertical diffusion lenticular lens part with a lens pitch of 100 μm.

On the other hand, a diffusing sheet containing, in an acrylic base material (refractive index 1.49), 5% by weight of spherical, cross-linked acryl-styrene copolymer resin beads (first light-diffusing particles) with a mean particle diameter of 55 μm and a refractive index of 1.51 and 8.5% by weight of spherical, cross-linked styrene beads (second light-diffusing particles) with a mean particle diameter of 65 μm and a refractive index 1.59 was prepared by extrusion molding.

The above-prepared Fresnel lens sheet and diffusing sheet were combined into a rear projection screen. This rear projection screen of Comparative Example 3 was mounted in a 60-inch PTV, and the image displayed was visually observed. The image was found to be very coarse.

What is claimed is:

1. A rear projection screen comprising:
   a Fresnel lens part in a shape of a Fresnel lens; and
   a diffusing part provided on a light-emerging side of the Fresnel lens part;
   wherein the diffusing part comprises light-diffusing particles having a mean particle diameter of not more than 1/5 of a lens pitch of the Fresnel lens part.

2. The rear projection screen according to claim 1, wherein:
   the diffusing part is provided in an optical sheet comprising a plurality of layers;
   the plurality of layers comprises a first diffusing layer as an outermost layer on a light-emerging side; and
   the first diffusing layer comprises first light-diffusing particles having a mean particle diameter of not more than 1/5 of the lens pitch of the Fresnel lens part.

3. The rear projection screen according to claim 2, wherein:
   the plurality of layers comprises a second diffusing layer located on a light-entering side of the first diffusing layer; and
   the second diffusing layer comprises second light-diffusing particles having a mean particle diameter greater than the mean particle diameter of the first light-diffusing particles.

4. The rear projection screen according to claim 1, wherein the light-diffusing particles comprise at least two types of particles having different refractive indices.

5. The rear projection screen according to claim 1, wherein the lens pitch of the Fresnel lens part is 120 μm or less.

6. The rear projection screen according to claim 1, wherein the mean particle diameter of the light-diffusing particles is 24 μm or less.

7. The rear projection screen according to claim 1, wherein:
   the Fresnel lens part is provided on a light-emerging-side surface of an optical sheet;
   the optical sheet comprises a vertical control lens part for controlling a vertical viewing angle formed on a light-entering-side surface of the optical sheet;
   the vertical control lens part is a vertical diffusion lenticular lens or prism part that extends in a horizontal direction and diffuses light in a vertical directions; and
   the vertical control lens part has a lens pitch of at least 5 times the mean particle diameter of the light-diffusing particles.

8. The rear projection screen according to claim 1, wherein:
   the diffusing part is provided on an optical sheet having a horizontal control lens part for controlling a horizontal viewing angle; and
   the horizontal control lens part is a horizontal diffusion lenticular lens or prism part that extends in a vertical direction and diffuses light in a horizontal direction.

9. A diffusing sheet incorporated in a rear projection screen comprising a Fresnel lens part in a shape of a Fresnel lens, the diffusing sheet being placed on a light-emerging side of the Fresnel lens part,
   wherein:
   the diffusing sheet comprises a diffusing part comprising light-diffusing particles having a mean particle diameter of not more than 1/5 of a lens pitch of the Fresnel lens part.

10. The diffusing sheet according to claim 9, wherein:
    the diffusing sheet comprises a plurality of layers;
    the plurality of layers comprises a first diffusing layer as an outermost layer on a light-emerging side; and
    the first diffusing layer comprises first light-diffusing particles having a mean particle diameter is not more than 1/5 of the lens pitch of the Fresnel lens part.

11. The diffusing sheet according to claim 10, wherein:
    the plurality of layers comprises a second diffusing layer located on a light-entering side of the first diffusing layer; and
    the second diffusing layer comprises second light-diffusing particles having a mean particle diameter greater than the mean particle diameter of the first light-diffusing particles.

12. The diffusing sheet according to claim 9, wherein the light-diffusing particles comprise at least two types of particles having different refractive indices.

13. The diffusing sheet according to claim 9, wherein the mean particle diameter of the light-diffusing particles is 24 μm or less.

14. The diffusing sheet according to claim 9, further comprising a horizontal diffusion lenticular lens or prism part that extends in a vertical direction and diffuses light in a horizontal direction.

* * * * *